Nov. 21, 1944.  W. G. BALDENHOFER  2,363,039
SURFACE GRINDER WITH AUXILIARY SPINDLES
Filed Dec. 22, 1941  3 Sheets-Sheet 1

INVENTOR
WILLIAM G. BALDENHOFER
ATTORNEYS

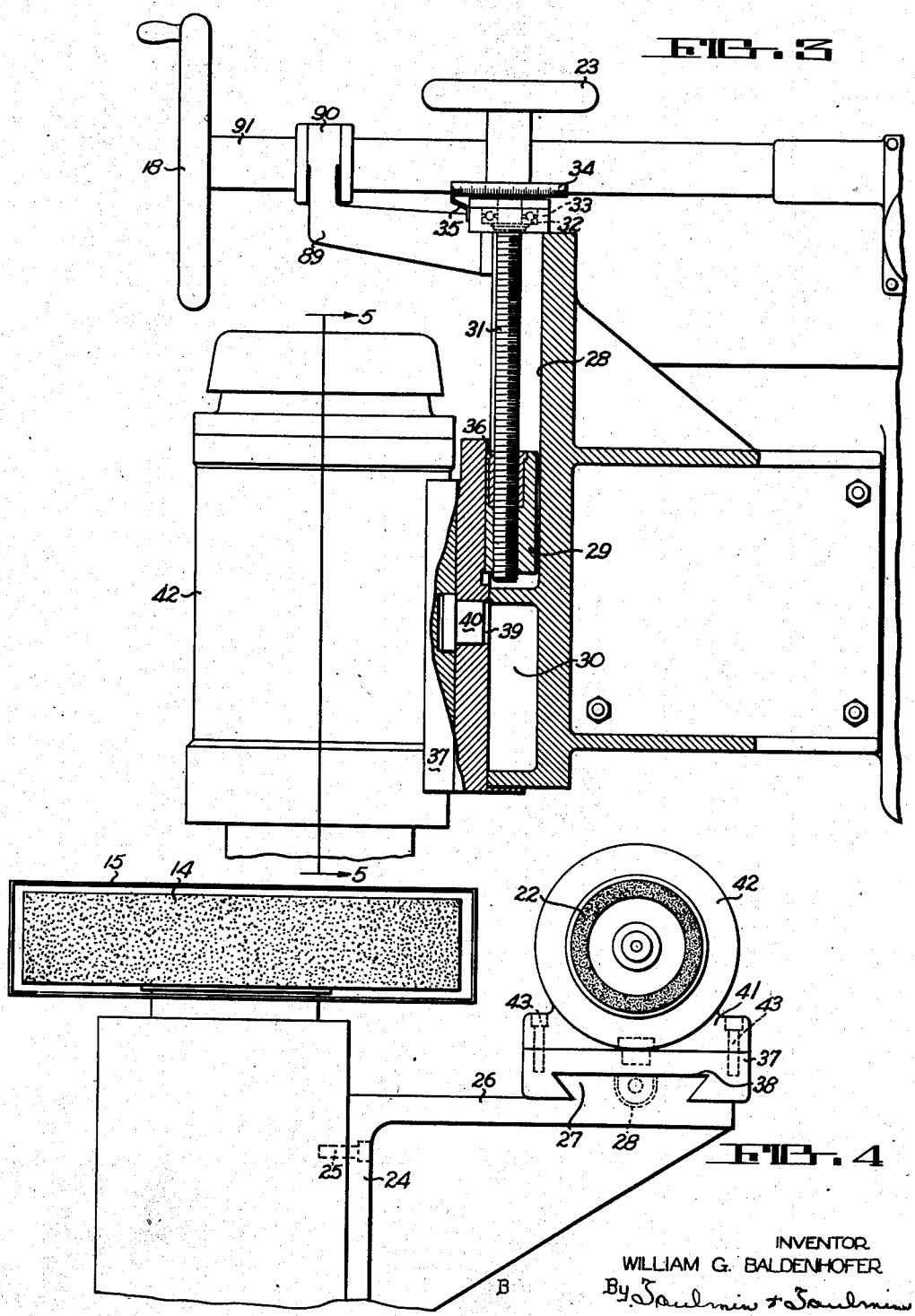

Nov. 21, 1944.  W. G. BALDENHOFER  2,363,039
SURFACE GRINDER WITH AUXILIARY SPINDLES
Filed Dec. 22, 1941  3 Sheets-Sheet 3
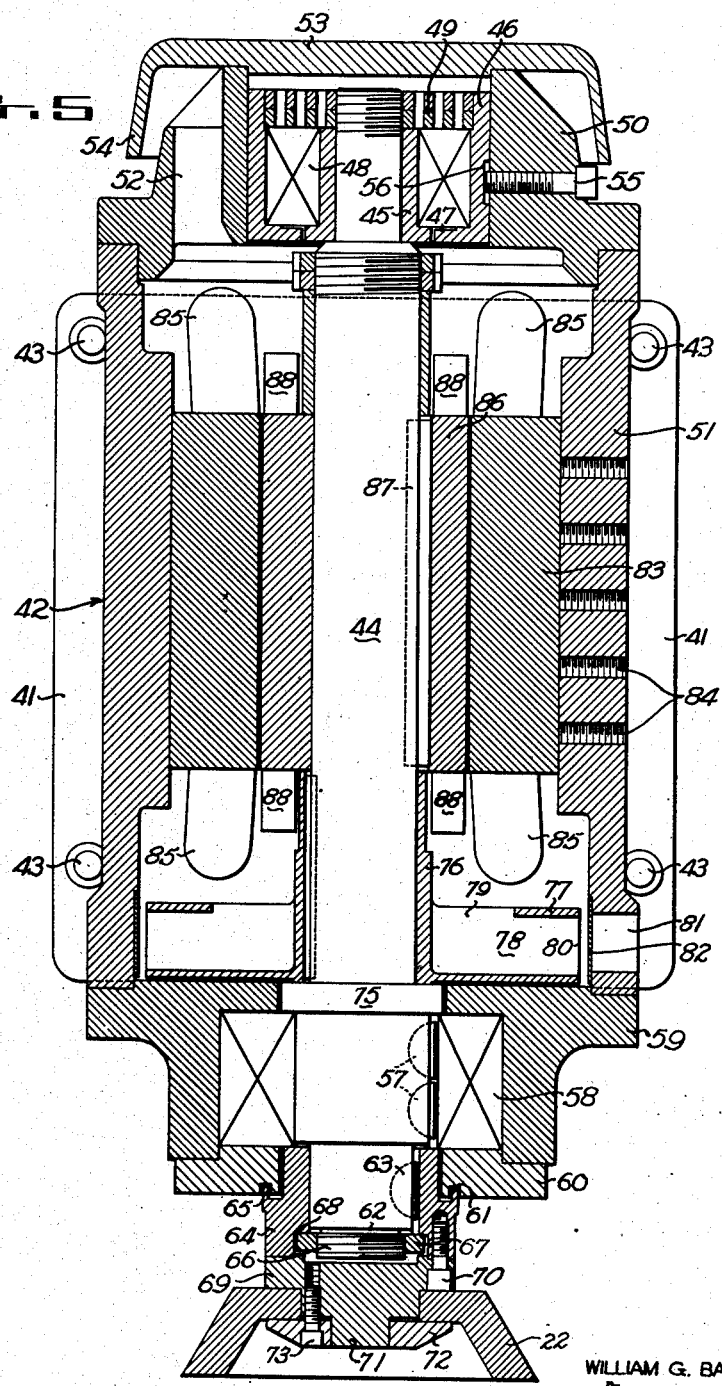
INVENTOR
WILLIAM G. BALDENHOFER
By Toulmin & Toulmin
ATTORNEYS Patented Nov. 21, 1944

2,363,039

UNITED STATES PATENT OFFICE 2,363,039

SURFACE GRINDER WITH AUXILIARY SPINDLE

William G. Baldenhofer, Springfield, Ohio, assignor to The Thompson Grinder Co., Springfield, Ohio, a corporation of Ohio Application December 22, 1941, Serial No. 424,033

2 Claims. (Cl. 51—3)

The present invention relates to precision working tools, and more particularly to machines for cutting, abrading or finishing surfaces and grooves, wherein a precision of dimension, spacing and angularity of the surfaces and the grooves is required.

In the metal-working arts it is often necessary to provide work surfaces which extend in different directions and bear accurate positional and directional relations with respect to one another. For example, certain types of machines, such as planers, shapers, grinders, etc. require dove-tail grooves and flat bearing surfaces which must not only conform with great accuracy to the specified dimensions, but with equal precision from the standpoint of direction and angularity of the surfaces, grooves, etc.

Heretofore, when machining a plurality of grooves, it has been customary first to work one of the surfaces to its finished dimensions and then to move the workpiece to a new position so that the second surface or groove may be likewise machined and finished. But there is no assurance that the workpiece will have been placed or orientated in the second or another position to provide machined surfaces which come within the assigned tolerances.

The primary object of the invention is to provide a tool-making apparatus which is adapted to machine and finish a plurality of surfaces spaced from or extending angularly with respect to one another, and in which close tolerances are required of the dimensions, spacings and angularities of the finished surfaces.

A more specific object is to provide an improved grinding machine which is adapted to grind to a precise tolerance a surface on a workpiece which extends in one direction, and to grind with an equal tolerance a surface which extends at a precise angle with respect to the first surface.

A still further object is to provide an improved grinder for grinding the surface of a workpiece to a close tolerance, and to form with equal precision a dove-tailed groove, extending at right angles to said surface, both as to the dimensions of the groove and the angularity of the groove with respect to the first surface.

The final object is to provide a grinding machine in which two grinding operations of an essentially different character may be performed by the same machine, employing the structure in such a manner that when one grinding operation is performed there is no interference with the other grinding operation, but both operations are so correlated as to provide extreme precision of dimension, depth, width, spacing and angularity between the ground surfaces.

The invention will be better understood when the following description is read in connection with the accompanying drawings.

In the drawings:

Figure 3 is an enlarged fragmentary view, partly in section, of the adjustment mechanism for moving one of the abrading surfaces in the vertical direction.

Figure 4 is a view looking upwardly against the two abrading elements from a position indicated by the line 4—4 in Figure 1, and in the direction of the arrows.

Figure 5 is an enlarged sectional view of one of the abrading elements and the actuating motor therefor. This sectional view is taken along the line 5—5 in Figure 3.

The invention has been typified by way of a grinding machine, but it will be understood that the principles of my invention may be applied equally well to all kinds of cutting, shaping, machining and abrading machines, in which close tolerances are required not only as to the dimensions, spacings, depths and widths of the finished surfaces, but also the angle which the various surfaces make with one another.

Figure 1:
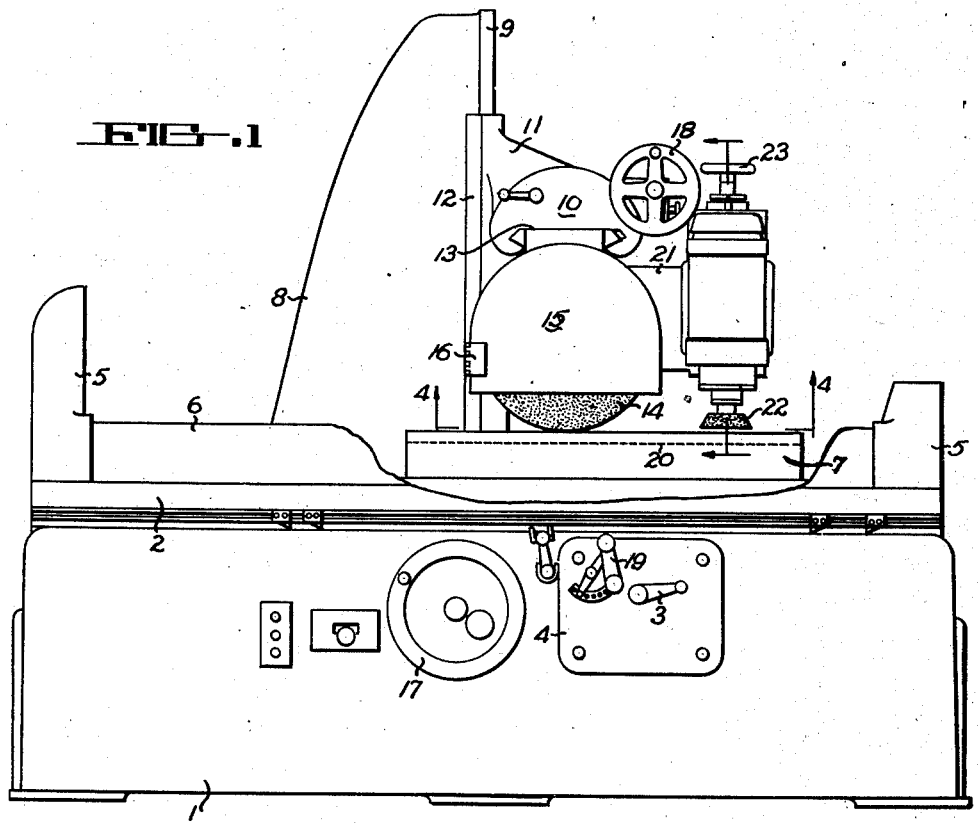
Figure 1 is a side elevational view of the improved machine showing a plurality of cutting or abrading surfaces, and in which one of the surfaces is in contact with the workpiece and the second surface is out of contact therewith.
Figure 2:
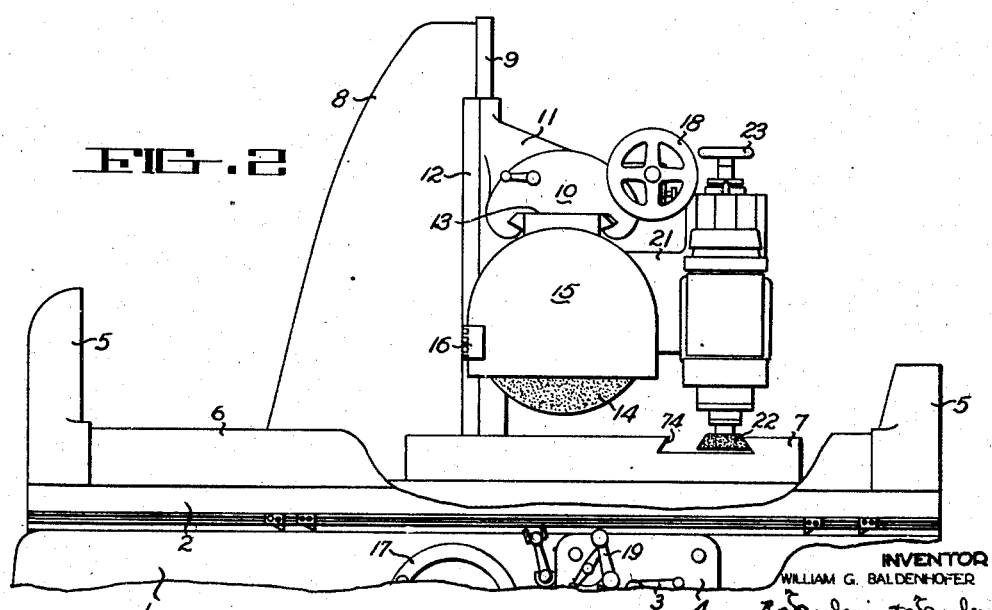
Figure 2 is a view similar to Figure 1, but changes in the positions of the abrading surfaces have been made to cause the second abrading surface to contact the work and the other abrading surface to be moved out of contact therewith.

The bed of a typical grinding machine is designated 1, and this bed carries on suitably V-shaped ways a reciprocatory carriage 2 which is usually actuated by a hydraulic motor (not shown) under the control of a lever 3 mounted on the apron 4. The carriage 2 is provided at each end with upstanding spark shields 5 and at opposite sides thereof there is also provided an upstanding sheetmetal rib 6, which also serves to intercept the sparks. The workpiece is indicated at 7, and may be secured to the carriage 2 in any suitable and well known manner, for example, by means of a magnetic clamp or a number of mechanical clamps which fit into T-grooves extending longitudinally of the carriage. The grinding wheel structure is supported on an upstanding hollow box type of frame 8, which is tapered at the top and terminates at the right-hand edge, as seen in Figures 1 and 2, in a dovetail slide 9 which is case hardened. The saddle 10 is carried by the upright 8, the saddle being provided with an elongated flange member 11 which is provided with a dove-tail groove adapted to receive the slide or tongue 9, and carrying gibs 12 at the rear side in order to assure a fairly tight but slidable fit.

The saddle 10 has considerable depth in the vertical direction, and is provided at its lower side with a double V-shaped groove 13 which extends the entire length of the saddle and carries the wheel head (not shown). The wheel head is provided with a spindle on which is mounted a grinding wheel 14 which is positioned in the vertical direction. A guard member 15 is preferably provided at the outside of the wheel, this guard member being hinged to the wheel head, as indicated at 16. The saddle 10 contains a hydraulic motor which is so connected to the tongue 13 that when pressure fluid is applied to the motor and controlled by the wheel 17, the wheel head and the wheel 14 are caused to move in the horizontal direction across the machine in order to provide a crossfeed for the grinder. In addition, the crossfeed mechanism may be manually actuated by means of suitable gearing which terminates in a hand wheel 18, and there is provided suitable protection apparatus which prevents simultaneous operation of the hydraulic motor and the hand wheel. In other words, the cross slide is operated either manually, by the wheel 18, or automatically by hydraulic pressure controlled at the wheel 17, but not simultaneously by these two agencies. When the hydraulic feed is employed the speed of the crossfeed is controlled by a lever 19 positioned on the apron 4. It is assumed, in Figure 1, that the grinding wheel 14 is being momentarily employed to provide a straight-edged groove along the length of the workpiece 7, the depth of this groove being indicated by the dotted line 20.

It is often necessary, in manufacturing machine tools, to provide the workpiece 7 not only with a groove which extends longitudinally of the workpiece, but also a groove perhaps of the dove-tail type which extends across the workpiece, i. e. exactly at 90° with respect thereto, or with any other desired angularity. In the case of high precision work the angle which one groove makes with the other is just as important as the dimensions and shapes of the grooves so that the same close tolerances may be required.

Heretofore it has been the practice, in case a plurality of grooves became necessary and particularly where one groove extended from the other with a definite predetermined angle to form first one of the grooves in the workpiece, using the single wheel 14, and then to turn the workpiece around through the desired angle and still using the same wheel 14, to form the transverse groove. In case the second groove was of the dove-tail type, which could not be formed by the straight-sided grinding wheel 14, the workpiece might be taken entirely out of the machine and set up on another grinder which was especially adapted to grind grooves of this particular configuration. But the point is that regardless of whether the same or a different grinding machine is employed to form the transverse groove, the position of the workpiece has been disturbed from its first position, and even when great care is exercised to re-position the workpiece so as to form the transverse groove, there is still bound to be at least a slight variation in the angularity which one groove makes with the other. These variations, even though small, may be fatal to the acceptance of the workpiece for a given tool, particularly when the results required are limited to close tolerances and high precision.

In accordance with my invention, I have eliminated the necessity for any movement of the workpiece 7 after it has been once set up in position, and which position has determined the direction of the first groove or finished surface. The improved machine is provided with an arm 21 which extends from the main wheel head, and which arm carries a second grinding wheel 22 typified as a horizontal grinder, together with its actuating element. The mechanical arrangement is such, as will be explained in connection with Figure 3, that the grinding wheel 22 may be elevated or lowered by means of a hand wheel 23, and in the position shown in Figure 1, the wheel 22 is out of contact with the workpiece because the main grinding wheel 14 is shown in contact therewith. In other words, the grinding wheels 14 and 22 are intended to be alternately used, never together. The structure for raising and lowering the second grinding wheel is shown in detail in Figure 3.

A large webbed bracket 24 is bolted as indicated at 25 to the wheel head extension 21. This bracket has a surface 26 which extends in the vertical direction and is provided with a dovetail slide 27, as shown in Figure 4. This slide is provided at the center with a relatively long, downwardly extending groove 28 having generally a semi-circular configuration and adapted to receive a nut 29. In order to lighten the metal content of the tongue or slide 27, the latter may be hollowed out at the middle, as indicated at 30, but leaving the dove-tail edges intact. The nut 29 is adapted to receive the lower end of a threaded rod 31 which is carried at the top on ball bearings 32 supported in a flat metal plate 33, suitably mounted on top of the bracket 24. The rod is also provided at its upper end with a dial 34 which cooperates with a stationary pointer 35 in such a manner that the vertical position of the nut 29 and of the grinding wheel 22 may be seen at a glance. It will be understood that as the hand wheel 23 is rotated the nut 29 is caused to move upwardly or downwardly, depending on the direction of rotation, and as will be explained, this vertical movement of the nut carries with it the grinding wheel 22.

It is obvious that after continued rotation of the threaded rod 31, looseness may develop between the rod and the nut 29 so that rotation of the wheel 23 is not accurately translated into changes in the vertical position of the grinding wheel 22. In order to assure a tightness of fit between the threaded rod 31 and the nut 29 there is provided a threaded sleeve inserted within a countersunk opening formed in the nut and interposed between the latter and the threaded rod. As the sleeve is turned so as to cause it to enter more deeply into the nut 29 the fit between the threaded rod 31 and the nut is made tighter, thus taking up for wear. The nut 29 is secured to a slide plate 37 provided with a dove-tail groove 38, the nut being secured to the plate at the bottom of the groove, as shown in Figure 4. The plate 37 is provided with a centrally positioned round opening 39 which is adapted to receive the shouldered portion or stud 40, the head of which is secured to the base 41 of a motor 42. This base is additionally secured to the slide plate 37 by a number of lag bolts 43, the purpose of which is to hold the base against the slide plate 37 because the stud 40 accurately fixes the base 41 with respect to the slide plate in the vertical direction. The details of the motor 42 and the mechanical connections by which the motor is caused to actuate the grinding wheel 22 are shown in Figure 5.

The main shaft of the motor is shown at 44 and is provided at one end with a flanged sleeve 45 forming part of a box bearing, of which the other part is constituted of a hollow cylindrical member 46, flanged at 47 at a position in line with the flange of the sleeve 45. A bearing 48 of any suitable and well known type is received by the interior of the box-shaped member, and thrust bearings 49 may be provided at the upper end of the bearing structure. The cylindrical member 46 is surrounded by an end bearing element 50 which rests on the upper end surface of the field frame 51 of the motor 42, and is secured thereto in any suitable and well known manner. The end bearing 50 is provided with one or more longitudinally extending openings 52 which expose the interior of the field frame to the atmosphere for ventilation purposes. A cap 53 with a downwardly extending peripheral flange 54 is secured to the upper edge of the end bearing 50, this cap also resting on the flat portion of the cylindrical member 46. The flange of the cap is of sufficient size to provide a passageway for air around the outside surface of the end bearing and through the opening 52, into the interior of the motor. In order to assume that the cylindrical member 46 is maintained in a stationary position, a radially extending screw 55 may be provided in the end bearing, this screw contacting a flat surface, indicated at 56, on the cylindrical member.

The other end of the shaft 44 is keyed, as indicated at 57, to the inner race of a ball or roller bearing, generally designated 58, this bearing being contained in an end bearing member 59 of the motor. The latter is supported in any suitable and well known manner on the field frame 51 of the motor. The bearing 58 is held in the vertical position by means of a closure plate 60 which abuts the end bearing 59, this closure plate being provided with an annular groove 61, for reasons which will be described presently. The shaft 44 is provided with a shouldered portion 62 which is keyed, as indicated at 63, to a rotary sleeve 64, this sleeve being provided with a vertically extending lip 65 which is received by the annular groove 61 in the closure plate. The lower end of the shaft portion 62 terminates in threads 66 for receiving a nut 67 which abuts a countersunk surface 68 on the sleeve 64. The latter is therefore held to the shaft in the vertical direction by means of a nut 67, and this sleeve serves to maintain the shaft 44 in its proper vertical position with respect to the stationary parts of the motor, including the field frame 51. Directly below the sleeve 64 there is a combined washer and spacer 69, this washer being provided with a number of cap screws 70 which secure the washer to the rotating sleeve 64. The washer terminates at the bottom in a centrally positioned pin 71 for receiving a cap 72 which is bolted to the spacer 69 as indicated at 73.

The grinding wheel 22 may take the shape of the frustum of a cone, depending on the shape of the dove-tail groove 74 which it is desired to cut and finish off in the workpiece 7 (Figure 2). The grinding wheel is hollow, and is provided with a flat surface sufficiently large to receive the cap 72 so that the latter bears against a considerable proportion of the grinding wheel interior. The grinding wheel 22 is therefore effectively secured to the shaft 44 through the spacer 69, the sleeve 64, through the key 63 to the shaft portion 62. The manner of securing the grinding wheel 22 to the shaft of the motor is important since the grinding wheel is hung in a vertical direction and is often of a complex shape determined by the size and shape of the dove-tail groove 74. I have found that when the grinding wheel is mounted in the manner described hereinbefore, a long life for the grinding wheel may be expected as the cap 72 provides a compressional stress of uniform intensity over a large area of the grinding wheel.

There is a collar 75 provided on the shaft 44, this collar serving to support a sleeve member 76 which is integrally joined to a hollow radially extending portion 77. The latter is provided with air passageways 78, the inlet and outlet openings for the passageways being indicated at 79 and 80, respectively. In line with the outlet port 80 are one or more openings 81 in the field frame, these openings being provided on the interior with a strainer or grill 82. Consequently, the air which enters the passageway 52 at the top end of the motor passes longitudinally through the motor and leaves the latter through the port 79, the passageway 78, the port 80 and the opening or openings 81 to the exterior. The grill 82 at the lower openings 81 and the overhanging portion 54 at the upper end of the motor are highly desirable in preventing grinding dust from entering the motor. The field magnets of the motor are illustrated at 83, these magnets being secured to the field frame by bolts passing through the threaded openings 84. The field windings are indicated at 85. In case the motor 42 is of the alternating type a squirrel cage rotor 86 may be provided, this rotor being keyed as indicated at 87 to the shaft, and having at each end longitudinally extending tabs 88 which give a strong fanning action.

It has been explained hereinbefore that inasmuch as the motor 42 is secured by the bolts 43 to the slide plate 37 (Figure 4), the rotation of the wheel 23 serves to move the motor and its attached grinding wheel 22 in a vertical direction, and assuming that there is no lag between the screw 31 and the nut 29 (Figure 3), the vertical position of the grinding wheel 22 may be read directly from the dial 34. The construction of the motor and its bearing together with the improved mechanical arrangement by which the grinding wheel is secured to the motor, assure that there is absolutely no vertical play of the shaft 44 within the motor, even after long usage, so that the position of the grinding wheel 22 can be determined within extremely close limits, even to the extent of .0001" which may be necessary on occasion.

It will be understood that the weight of the motor 42 and the grinding wheel is carried by the threaded rod 31 in order to provide a single control as to the vertical position of the grinding wheel at the hand wheel 23. For that reason considerable study and development work were necessary to provide a suitable form of support which could be readily adjusted in the vertical direction, and yet would not tend to introduce vibration, excessive wear or any other factor by which the grinding wheel 22 would be caused to run out of true. The magnitude of the suspension problem will be appreciated when it is recalled that the shaft 44 operates at an extremely high speed, 1800 or more R. P. M., and the motor as well as the suspension actuating element are positioned directly over the grinding wheel, and unless properly designed and protected from dust are bound to show excessive wear which translates itself into errors in the dimensions and shapes of the ground surfaces. However, I have found that the structure which has been shown in detail in Figures 3 and 5 lends itself particularly well to all of the rigid requirements for a dust-proof, readily adjustable and accurately set suspension in order to bring the grinding wheel 22 to its proper grinding position in the vertical direction. As shown in Figure 3, it may be necessary to extend the hand wheel 18, which controls the horizontal position of the grinding wheels 14 and 22 at the saddle 10, to a position well to the left so as to clear the shield 54 of the motor 42. In that case a supporting arm 89 may project outwardly from the arm 21, terminating in a bearing 90 for supporting the wheel shaft 91 intermediate its length.

It will be understood that I desire to comprehend within my invention such modifications as come within the scope of the claims and the invention.

Having thus fully described my invention, what I claim as new and desire to secure by Letters Patent, is:

1. A groove-forming machine employed in connection with the manufacture of precision parts having grooves which extend angularly with respect to one another within extremely close angular and dimensional limits, said machine comprising a base, a table on said base and means for reciprocating said table in one direction only, a column rigid with said base, a slide, said slide forming with said column a dove-tailed guide, a saddle having a flange adapted to receive said guide and adjustable vertically therealong, said saddle having means to insure an accurate fit between the flange of said saddle and said guide, a cross slide, means for horizontally adjusting the cross slide on said saddle, a tool carriage mounted on the cross slide, a tool mounted on said carriage, a second tool mounted on the carriage, and means whereby said second tool may be adjusted vertically but not horizontally with relation to said first-named tool.

2. A groove-forming machine employed in connection with the manufacture of precision parts having grooves which extend angularly with respect to one another within extremely close angular and dimensional limits, said machine comprising a base, a table on said base and means for reciprocating said table in one direction only, a column rigid with said base, a slide, said slide forming with said column a dove-tailed guide, a saddle having a flange adapted to receive said guide and adjustable vertically therealong, said saddle having gibs to insure an accurate fit between the flange of said saddle and said guide, a cross slide, means for horizontally adjusting the cross slide on said saddle, a tool carriage mounted on the cross slide, a tool mounted on said carriage, a second tool mounted on the carriage, and means whereby said second tool may be adjusted vertically but not horizontally with relation to said first-named tool.

WILLIAM G. BALDENHOFER.